United States Patent
Rill et al.

(10) Patent No.: US 9,417,837 B2
(45) Date of Patent: Aug. 16, 2016

(54) MULTIPLE INPUT AND PASSENGER ENGAGEMENT CONFIGURATION TO INFLUENCE DYNAMIC GENERATED AUDIO APPLICATION

(71) Applicants: VOLKSWAGEN AG, Wolfsburg (DE); AUDI AG, Ingolstadt (DE)

(72) Inventors: Florian Rill, Braunschweig (DE); Marco Antonio Lobato Fregoso, San Francisco, CA (US); Nicholas Daniel Kubiak, Burlingame, CA (US)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 221 days.

(21) Appl. No.: 14/195,883

(22) Filed: Mar. 4, 2014

(65) Prior Publication Data

US 2015/0254052 A1    Sep. 10, 2015

(51) Int. Cl.
*G06F 3/00* (2006.01)
*G06F 3/16* (2006.01)
*G01C 21/00* (2006.01)
*G01S 1/02* (2010.01)
*G08G 1/0962* (2006.01)
*G10K 15/02* (2006.01)
*H04R 3/00* (2006.01)
*H04W 4/02* (2009.01)
(Continued)

(52) U.S. Cl.
CPC ............ *G06F 3/165* (2013.01); *G01C 21/00* (2013.01); *G01S 1/02* (2013.01); *G08G 1/0962* (2013.01); *G10K 15/02* (2013.01); *B60R 25/00* (2013.01); *G01L 19/08* (2013.01); *G08G 1/0968* (2013.01); *H04R 3/00* (2013.01); *H04R 2420/07* (2013.01); *H04R 2499/13* (2013.01); *H04W 4/02* (2013.01)

(58) Field of Classification Search
CPC ......... G06F 9/4856; G06F 3/16; G06F 3/165; G06F 17/00; G08B 29/00; G08B 25/08; G10K 15/02; G10K 11/00; H04R 3/00; G10H 7/00; G01C 21/32; G01C 21/00; G08G 1/0968; G08G 1/09; G08G 1/0962; G01S 1/02; H04W 4/02; B60R 25/00; G01L 19/08; G09F 9/00
USPC ................ 381/86, 123, 81, 61, 85; 709/204; 340/5.61, 438, 692, 901, 905, 5.1; 701/211, 1, 200, 208, 29.1, 118, 423, 701/207, 10, 24, 36; 715/727; 84/615, 609; 455/414.2, 420, 435.3, 440
See application file for complete search history.

(56) References Cited

U.S. PATENT DOCUMENTS 6,446,002 B1 * 9/2002 Barton ............... G01C 21/3629
340/988
7,132,596 B2   11/2006 Nakabo et al.
(Continued)

*Primary Examiner* — Vivian Chin
*Assistant Examiner* — Ubachukwu Odunukwe
(74) *Attorney, Agent, or Firm* — Barnes & Thornburg LLP

(57) ABSTRACT

Apparatus, system and method for generating and reproducing audio, were vehicle data, representing a vehicle characteristic, is produced and transmitted to a portable processing device communicatively coupled to a vehicle. The vehicle data is processed to determine a vehicle state and an audio generation application is invoked based on the determined vehicle state. The portable processing device receives user inputs representing physical inputs/manipulation, wherein audio is generated based on the user inputs. The portable processing device may be communicatively coupled to other portable devices, wherein user inputs from the other portable devices generate and/or modify audio.

23 Claims, 5 Drawing Sheets

(51) Int. Cl.
*B60R 25/00* (2013.01)
*G08G 1/0968* (2006.01)
*G01L 19/08* (2006.01)

(56) References Cited

U.S. PATENT DOCUMENTS

| | | |
|---|---|---|
| 7,317,386 B2 | 1/2008 | Lengning et al. |
| 8,035,023 B2 | 10/2011 | Hernandez et al. |
| 8,207,837 B2 | 6/2012 | Lengning et al. |
| 8,909,414 B2 * | 12/2014 | Christie ............... B60K 35/00 701/31.4 |
| 2001/0007089 A1 | 7/2001 | Takeuchi |
| 2002/0196134 A1 * | 12/2002 | Lutter ................... G08G 1/166 340/426.1 |
| 2003/0220722 A1 * | 11/2003 | Toba ....................... G10K 15/02 701/1 |
| 2008/0301505 A1 * | 12/2008 | Harrington ............. G06F 11/32 714/47.1 |
| 2011/0285547 A1 * | 11/2011 | Crowe ...................... G03F 1/80 340/905 |
| 2013/0099892 A1 * | 4/2013 | Tucker ............... G07C 9/00309 340/5.61 |
| 2015/0032812 A1 * | 1/2015 | Dudley ........... H04N 21/42203 709/204 |

* cited by examiner

MULTIPLE INPUT AND PASSENGER ENGAGEMENT CONFIGURATION TO INFLUENCE DYNAMIC GENERATED AUDIO APPLICATION

BACKGROUND

The present disclosure is directed to vehicle data processing and audio generation and reproduction. More specifically, the present disclosure is directed to processing vehicle characteristic data and associated portable device data to invoke and generate one or more audio applications.

Reactive music systems (or dynamically generated audio systems) are a non-linear form of audio and music generation that is configured to adapt to the listener's environment. Similar to generative music, which may generally be defined as music created by a system that is ever-different and changing, reactive music systems provide a constantly evolving, fluidly changing musical experience. Since formal music training is not required, reactive music has gained considerable popularity and interest over recent years.

Attempts at providing automotive applications for reactive music has resulted in systems where active user interaction is minimal and usually limited to one centralized user interface (or "master device") typically located in the center console of a vehicle. What is needed is an improved user interaction configuration that adds mechanisms that allows users to engage by providing them with multiple interfaces, made accessible on other devices (or "slave devices"), such as a portable computing device, in order to actively influence the audio signal generated. Interactions can take place inside a vehicle without additional driver distraction or making use of the main vehicle user interface (or "entertainment system") and without reaching out to the center console.

SUMMARY

Various apparatus, systems and methods are disclosed for vehicle-based audio generation and/or reproduction. In one exemplary embodiment, an apparatus is disclosed for generating audio, where the apparatus comprises a first input configured to receive vehicle data comprising information relating to a vehicle characteristic and storage, operatively coupled to the input for storing the vehicle data. A processing apparatus may be operatively coupled to the storage, wherein the processing apparatus is configured to process the vehicle data to determine a vehicle state. A second input may be configured to receive user input data comprising physical inputs from a user, wherein the processing apparatus is further configured to invoke an audio generation application that is associated with the vehicle state and generate audio based on the user input data.

In other exemplary embodiments, the first input comprises a wireless interface, and the vehicle characteristic comprises at least one of a vehicle parameter indicating an operational state of a vehicle component, and a physical location of the vehicle. The processing apparatus may determine the vehicle state by processing the vehicle parameter over a predetermined period of time. The audio generation application comprises at least one of a software synthesizer, a sampler, and effect processing module. The apparatus may further comprise a third input for receiving device data comprising (i) information indicating the presence of a device proximate to the apparatus, and (ii) other user input data comprising physical inputs from another user associated with the device, wherein the processing apparatus is configured to generate and/or modify audio based on the other user input data. The processor is further configured to generate audio based on the vehicle data and store the generated audio into the storage as a file.

In another exemplary embodiment, a method for generating audio in an apparatus is disclosed, where the method comprises the steps of receiving vehicle data at a first input of the apparatus, where the vehicle data comprises information relating to a vehicle characteristic. The method further comprises processing the vehicle data in a processor of the apparatus to determine a vehicle state and receiving user input data at a second input of the apparatus, wherein the user input data comprises information relating to physical inputs from a user. An audio generation application is invoked in the apparatus based on the vehicle data, and audio is generated using the audio generation application, wherein at least a portion of the audio is generated using the user input data.

In other exemplary embodiments, the vehicle data is received via one of a wired and a wireless interface, and processing the vehicle data comprises at least one of (i) processing a vehicle parameter indicating an operational state of a vehicle component, and (ii) determining a physical location of the vehicle. The vehicle data may be processed over a predetermined period of time. Invoking the audio generation application may comprise invoking at least one of a software synthesizer, a sampler, and effect processing module. Receiving device data may comprise (i) information indicating the presence of a device proximate to the apparatus, and (ii) other user input data comprising physical inputs from another user associated with the device, where at least one of generating and modifying audio is based on the other user input data. Generating audio using the audio generation application may comprise the step of generating audio based on the vehicle data. The generated audio may be transmitted as a digital stream or as a file.

In yet another exemplary embodiment, a processor-based method is disclosed for reproducing audio in a vehicle entertainment system, comprising the steps of establishing a connection with a portable device, producing vehicle data in a processor, wherein the vehicle data comprises information relating to a vehicle characteristic. The vehicle data is transmitted to the portable device via the connection, and audio is received for reproduction in the vehicle entertainment system via the connection, wherein the audio is based at least in part on the vehicle data and input data from the device, and wherein the input data reflects physical inputs made from a user. The received audio may be reproduced in the vehicle entertainment system.

In other exemplary embodiments, the vehicle data comprises at least one of (i) a vehicle parameter indicating an operational state of a vehicle component, and (ii) a physical location of the vehicle. The vehicle data may be produced over a predetermined period of time. Reproducing the received audio may comprise one of (i) reproducing the received audio as a digital stream, and (ii) reproducing the received audio as a digital file.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Figure 1:
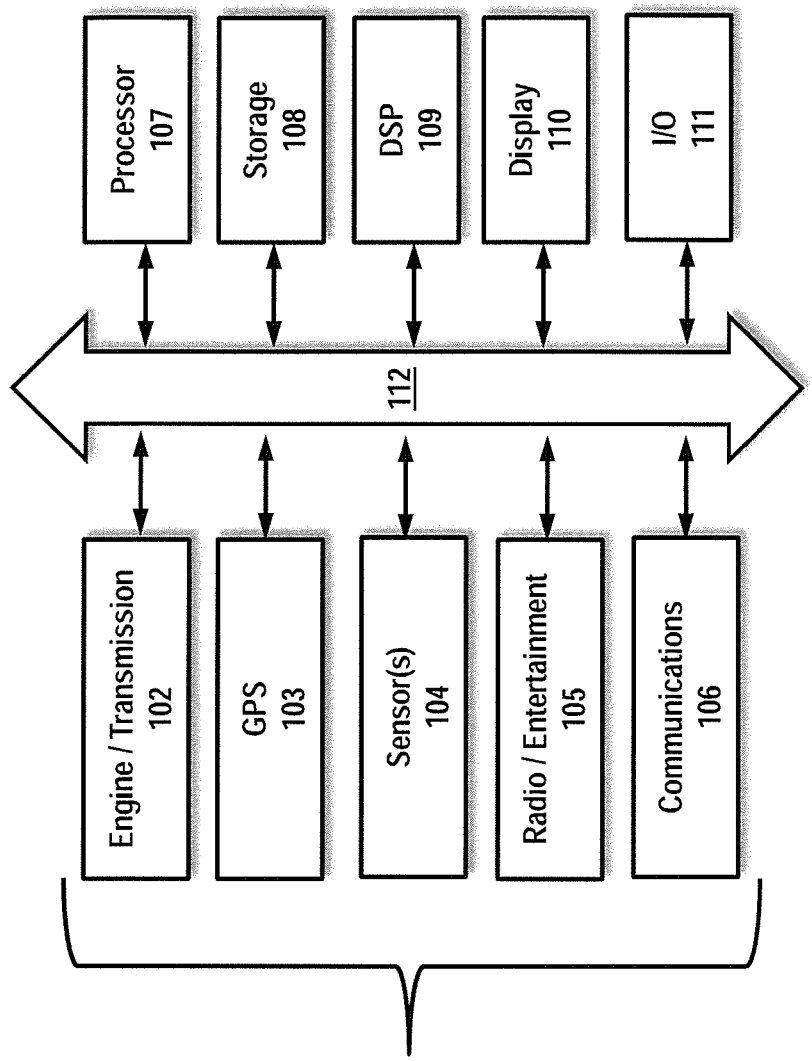
FIG. 1 is an exemplary system illustrating vehicle characteristic generation and inputs for reactive audio generation.
Figure 1:
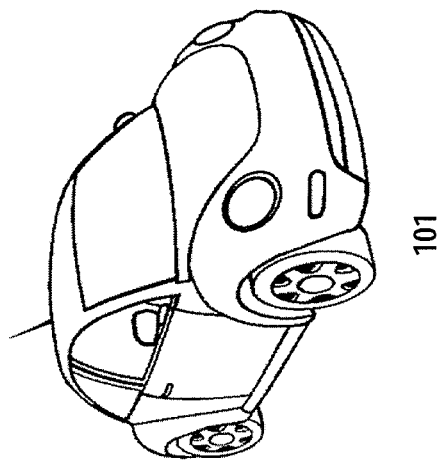

Turning to FIG. 1, the drawing illustrates an exemplary vehicle system 101 comprising various vehicle electronics subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 103 provides location data for vehicle 10'. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules in FIG. 1 to communicate with each other and/or external devices via a wired connection or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system of FIG. 1. Storage 108 may be configured to store data, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then mathematically manipulate them as needed. Display 110 may be configured to provide visual (as well as audio) indicial from any module in FIG. 1, and may be a configured as a LCD, LED, OLED, or any other suitable display. Display may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
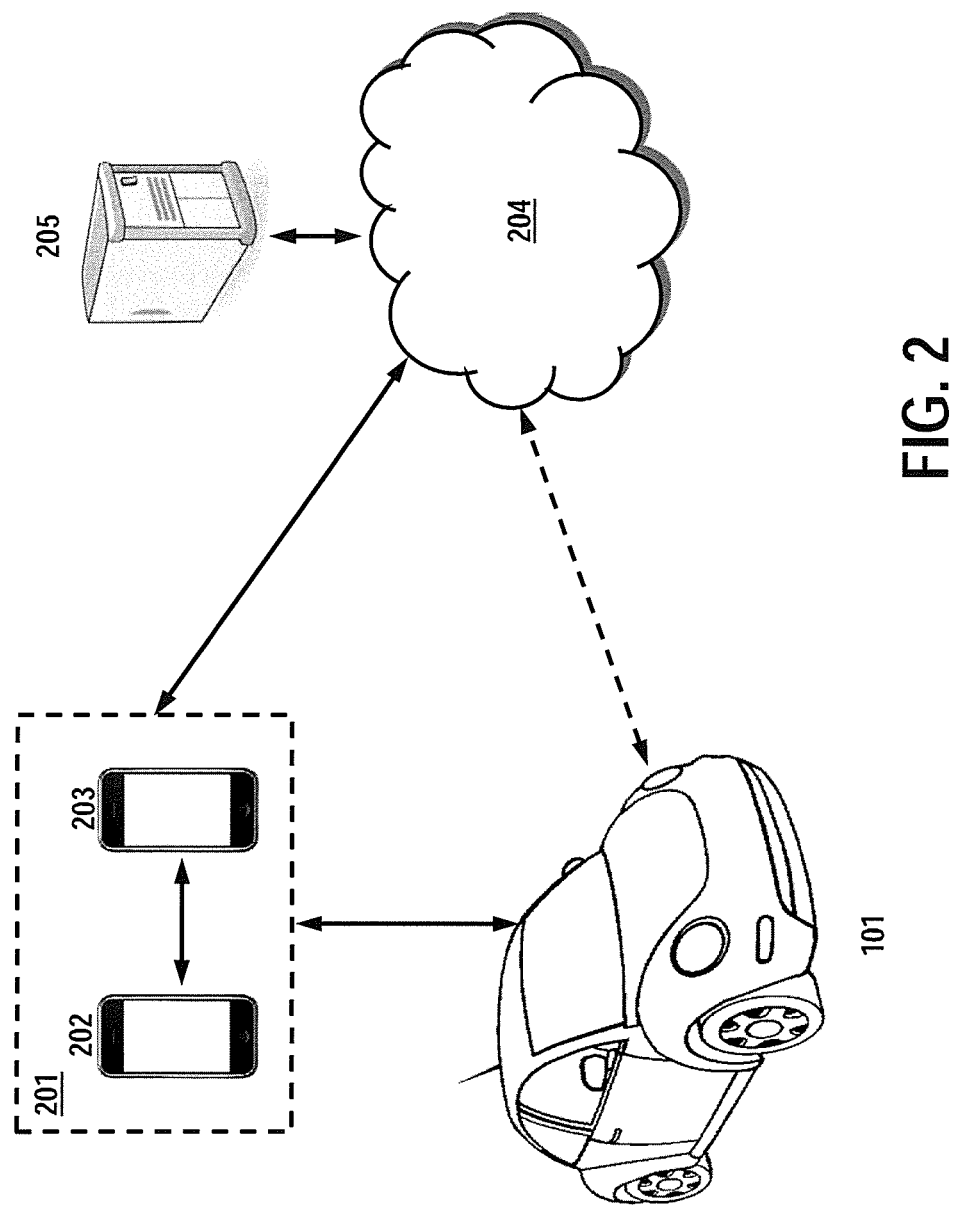
FIG. 2 is an exemplary block diagram illustrating the vehicle of FIG. 1 communicatively coupled to one or more portable devices and a computer network under one embodiment.

Turning to FIG. 2, an exemplary embodiment is illustrated, where a vehicle 101 (see FIG. 1), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 are configured to receive vehicle characteristic and/or parameter from vehicle 101, and are further configured to communicate with each other. Portable devices 201 are also configured to communicate with wireless network 204 in order to send/receive data from a central server 205. Similarly, in one embodiment, vehicle 101 may also be configured to communicate with network 204. Server 205 may be also configured to perform back-end processing for devices 201 and vehicle 101, and further communicate with other remote servers for additional functionalities, such as software application, media servers, social media, and the like.

In one embodiment, devices 202, 203 may also be registered as primary and secondary devices in the system, in order to determine a priority for creating and/or controlling audio generation. In certain cases, multiple devices may be detected in a vehicle, where one of the device users is likely the driver. In one embodiment, devices 202, 203 may have a default setting, so that one device automatically is registered as a primary device, and the other a secondary device. In order to promote safe driving habits, the system of FIG. 2 may be configured in another embodiment to prompt devices before use to avoid distractions while driving. The prompt may affirmatively activate a device (e.g., "tap here if you are a passenger") or negatively disable a device (e.g., "tap here if you are the driver"). In another embodiment, the devices may have a game, puzzle, questionnaire pushed to each device, where the winner would be awarded primary status. In one embodiment, unregistered devices may be detected in a vehicle. In this event, the devices may be guided through a registration process by the vehicle to allow participation in audio generation. In this embodiment, the newly registered device may be able to register as a permanent user, or alternately designated as a "guest" user, where the registration is limited for a predetermined time period. It should be understood that the, while the terms "primary" and "secondary" user is used, the concept may be extended to multiple other users (e.g., 3-8 additional users), where each user may have a different priority level and/or share priority with other users in order to collaborate in audio generation.

Furthermore, devices 201 may be configured to send/receive communications from other devices, registered with their respective, different, vehicles. In this embodiment, devices 201 may register and store a "friends" list of other devices. Utilizing vehicle or device GPS, devices 201 may determine if other users are in proximity utilizing network 204. In another embodiment, users may activate friends for participation in audio generation utilizing in-app device communication, such as cellular, SMS, MMS, or any other suitable communication protocol. Such configurations are particularly advantageous for collaborative audio generation and for social media purposes.

Figure 3:
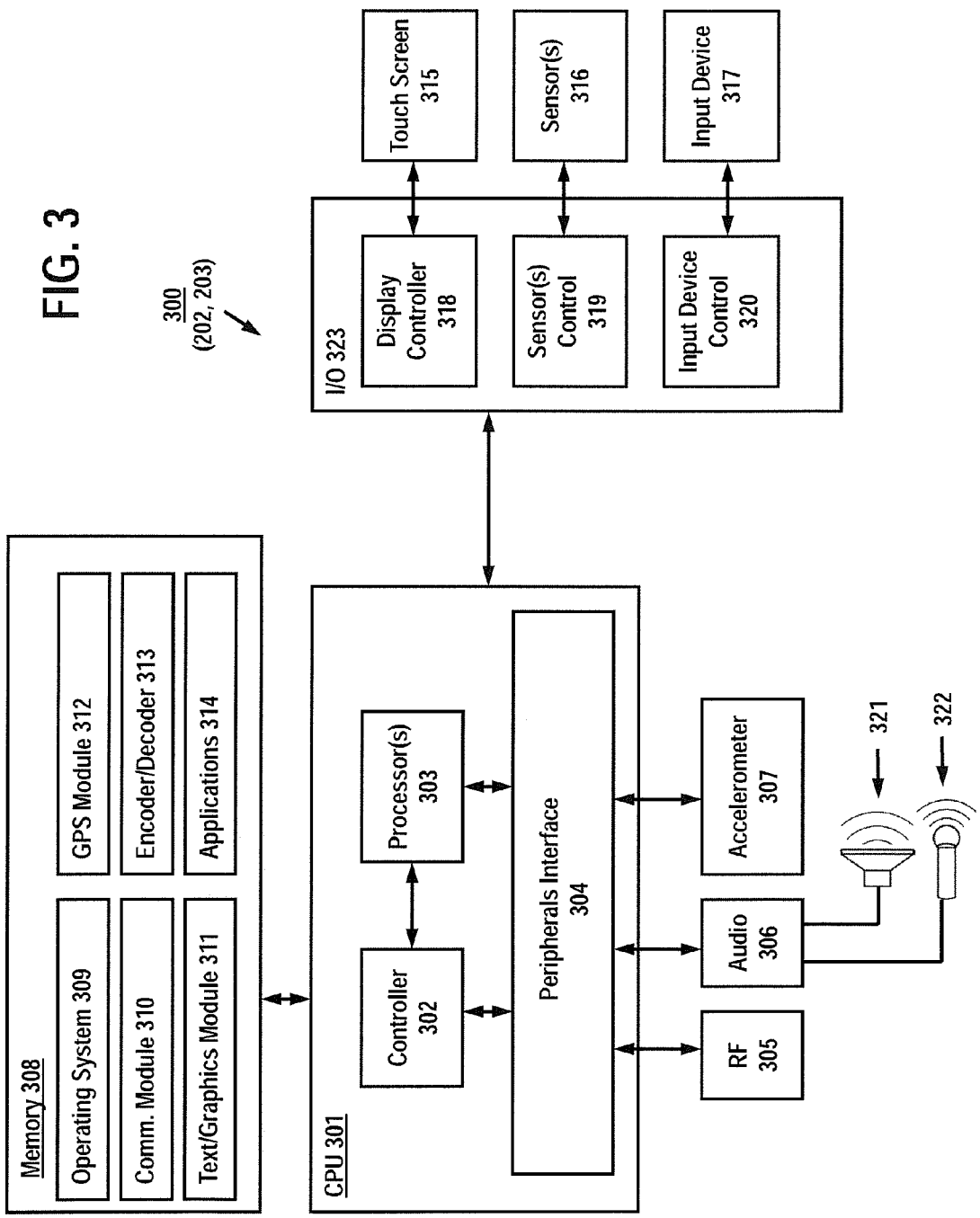
FIG. 3 is an exemplary block diagram illustrating components of a portable device, configured for reactive audio generation under one embodiment.

FIG. 3 is an exemplary embodiment of a portable computing device 300 (such as devices 202, 203 of FIG. 2), and may be a smart phone, tablet computer, laptop or the like. Device 300 may include a central processing unit (CPU) 301 (which may include one or more computer readable storage mediums), a memory controller 302, one or more processors 303, a peripherals interface 304, RF circuitry 305, audio circuitry 306, a speaker 321, a microphone 322, and an input/output (I/O) subsystem 323 having display controller 318, control circuitry for one or more sensors 319 and input device control 320. These components may communicate over one or more communication buses or signal lines in device 300. It should be appreciated that device 300 is only one example of a portable multifunction device 300, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, encoder/decoder 313 and memory controller 302 may be implemented on a single chip, such as a chip 301. In other embodiments, they may be implemented on separate chips.

The RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 204, converts the audio data to an electrical signal, and transmits the electrical signal to speaker 321. The speaker 321 converts the electrical signal to human-audible sound waves. Audio circuitry 306 also receives electrical signals converted by the microphone 322 from sound waves, which may include encoded audio, described above. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 323 couples input/output peripherals on the device 300, such as touch screen 315 and other input/control devices 317, to the peripherals interface 304. The I/O subsystem 323 may include a display controller 318 and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof (collectively termed "graphics"). In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 323. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, encoder/decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including audio applications, software synthesizers, audio sampling applications, address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication.

Figure 4:
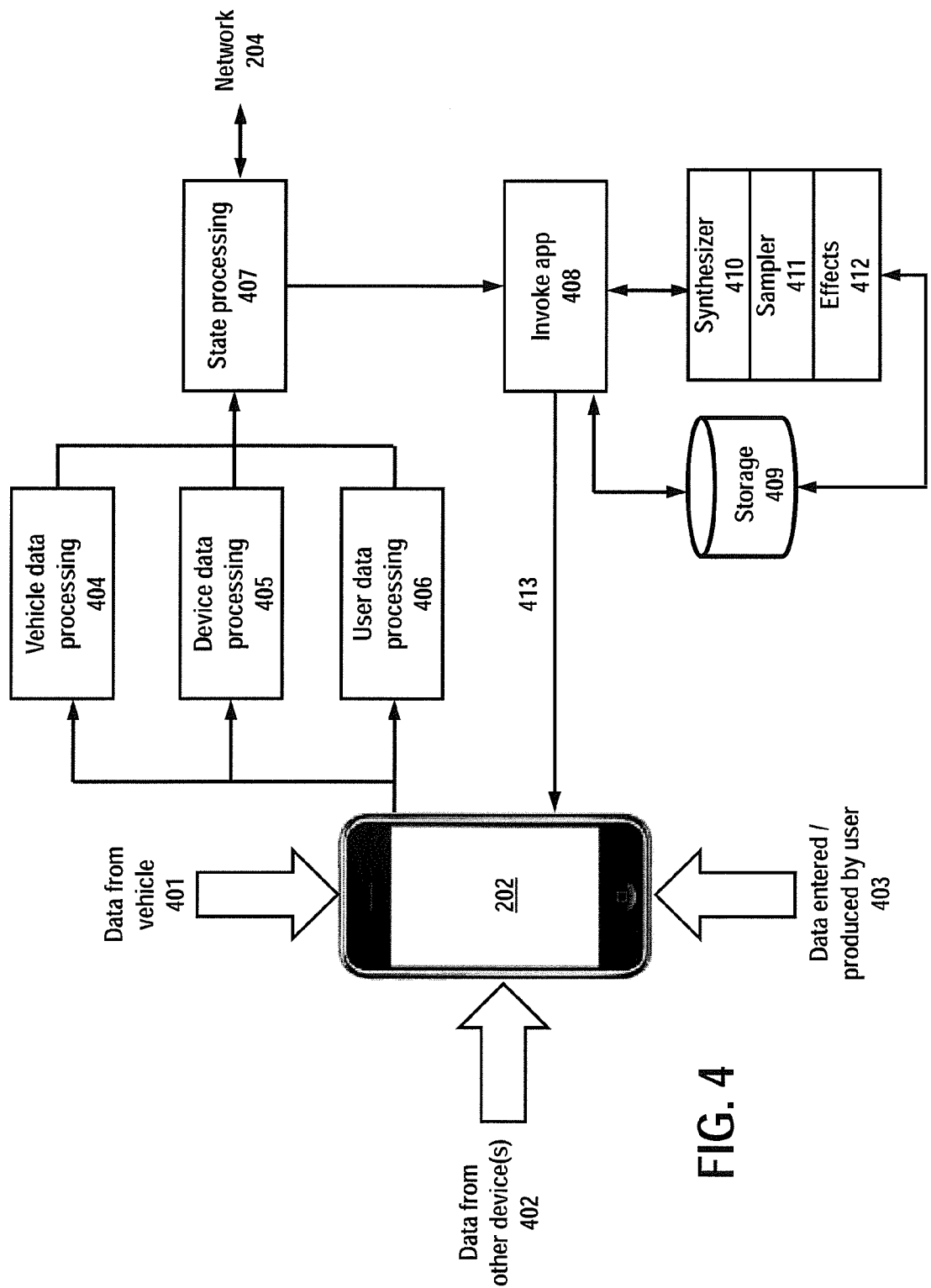
FIG. 4 is an exemplary illustration for a portable device configured to generate reactive audio based on vehicle, user and/or device data under one embodiment.

Turning to FIG. 4, portable computing device 202 is configured to receive data from vehicle 401, data from one or more other devices 402 (e.g., device 203), and data entered and/or produced by a user 403. For data received from vehicle 401, this data may comprise any data produced vehicle 101, discussed above in FIG. 1. The data is preferably received via a wireless connection (e.g., Bluetooth), but may also be received in a wired connection as well. Data from vehicle 401 may include, but is not limited to: turn signal data, gear data, speed data, temperature sensor data, GPS data, entertainment system data, brake activation/deactivation data, climate system data, windshield wiper activation/deactivation data, headlamp activation/deactivation data, fuel level data, oil pressure data and window motor data. Additionally, data from a vehicle microphone may be used as well. Data from other devices 402 may comprise presence data that indicates the presence of other devices that may be registered with vehicle 101. Other device data 402 may comprise various data input that contributes, influences or generates audio, as will be explained in greater detail below. Data entered and/or produced by user 403 may comprise entries on a keypad or touch screen (315, 317), physical manipulation of device 202 which activates a sensor/accelerometer (307, 316), or capturing an environmental characteristic on the device (316, 322), such as voice, ambient audio, temperature, etc.

As data 401-403 is received in device 202, each type of data may be individually processed in 404-406 and subjected to state processing in 407. For each of data processing 404-406, the raw data is subjected to algorithmic processing to determine one or more characteristics for the received data. The algorithmic processing may occur with or without user interaction. As an example, vehicle data processing 404 may process speedometer data, headlamp data and heating motor data to determine that a vehicle is driving in excess of 50 MPH, with the headlamps on, with the outside air temperature at 32° F. Device data processing 405 may process device data to determine that device 202 is a primary user/passenger that is in the vehicle with two other registered users, and is in further communication with one other device in another vehicle. During state processing 407, each of the data in 404-406 is individually and/or collectively processed to determine a state of the device relative to the vehicle. The state processing may comprise at least one, and preferably a plurality, of threshold state determinations of the vehicle and/or the device (s). For example, if state processing 407 determines that a vehicle has sustained a threshold speed of at least 55 MPH for at least 5 minutes or more, this would be indicative of highway driving; if state processing 407 determines that vehicle brakes are being applies at least 3 times every 30 seconds, this would be indicative of city driving and/or rush hour traffic; if state processing 407 determines that the windshield wipers are activated and the ambient temperature is above 32° F., this would be indicative of driving in rainy conditions; ambient temperatures below 32° F. would be indicative of driving in snowy conditions. In certain embodiments, state processing 407 may send/receive data from network 204 in order to assist in processing. It should be understood by those skilled in the art that a multitude of different state determinations may be made under the present disclosure.

Once a state is determined in state processing 407, an audio generation application is invoked for that state in 408, where the audio generation may comprise a synthesizer 410, sampler 411 and/or effects processing module 412, which may call/store specific audio generation routines from storage 409. Synthesizer 410 is preferably embodied as a software synthesizer (or "softsynth") that may be a stand-alone application, or a plug-in softsynth running off a host application such as a Digital Audio Workstation, which records the music that is played. Exemplary plug-in technologies include VST, Audio Units (AU), Avid Audio eXtension (AAX), Real Time AudioSuite (RTAS), DirectX instrument (DXi) and MOTU Audio System (MAS). The synthesizer audio generation may be based on frequency modulation (FM), wavetable synthesis, linear algorithmic (LA) synthesis, hybrid and abstract synthesis.

Additionally, audio generation may be based on sample playback synthesis, which would combine elements of synthesizer 410 and sampler 411, in certain embodiments. Sampler 411 is preferably a digital sampler configured to generate audio by using digital recordings (or "samples") of sounds that are loaded or recorded into it by the user and then played back by means of the sampler program itself, a keyboard, device input, sequencer or other triggering mechanism to perform or compose music. A single sample may often be pitch-shifted to produce musical scales and chords. In one embodiment, sampler 411 may use filters, modulation via low frequency oscillation and other synthesizer-like processes that modify the original sound in many different ways. These sound modifications may be integrated into the sampler 411 application, or be performed in conjunction with effects module 412. In a preferred embodiment, sampler 411 has polyphonic capabilities allowing it to play more than one note at the same time, and is also multitimbral, allowing it to generate different sounds at the same time.

Furthermore, audio may be generated from a standalone audio generation application (e.g., within application 408), which may comprise software code written in a native programming application. In one embodiment, the audio generation application may be structured according to an audio development tool, such as Max or Pure Data. The Max program is a modular audio development tool, with most routines existing in the form of shared libraries. Audio sounds may be developed for generation using an API for implementing audio routines (or "external objects"). Pure Data ("Pd") is a dataflow programming language, similar to Max, where functions or "objects" are linked or "patched" together in a graphical environment which models the flow of the control and audio.

Audio generated from 408 is transmitted 413 back to device 202, where it may be played and/or stored. In one embodiment the audio path 413 may be utilized as a feedback source, where state processing 407 affects or modifies the sound of existing audio that has been generated. This embodiment may be particularly advantageous in embodiments, where a base audio sound is continuously generated, and is configured to be modified and/or affected by the state processing of data 404-406.

Figure 5A:
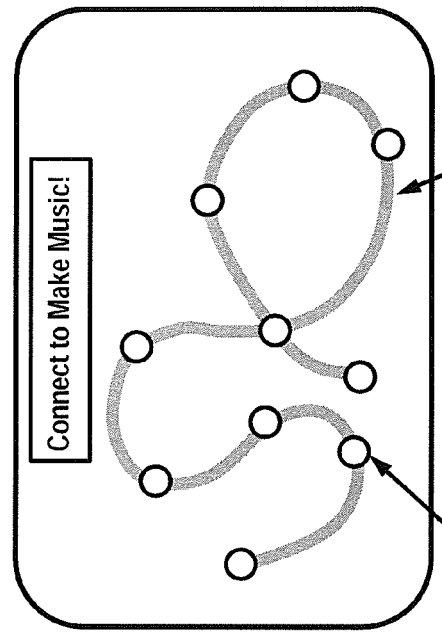
FIGS. 5A-5D are exemplary screen shots of reactive audio application interfaces under numerous embodiments.
Figure 5B:
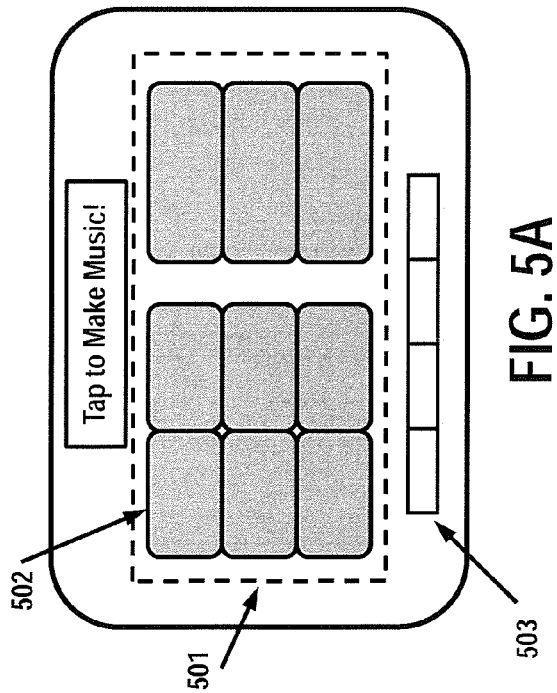

Exemplary user interfaces for audio generation are illustrated in FIGS. 5A-5D. In FIG. 5A, an embodiment is shown where an audio generation interface area 501 comprises a plurality of virtual pads 502, which may be the same or different sizes as shown in the figure. Here, users that tap, hold and/or move the pads initiate the generation of audio in conjunction with data 404-406, which is configured to additionally modify the audio. Each virtual pad 502 may be configured to generate a different audio sound. In one embodiment, pressing and holding multiple pads may generate additional sounds that are different from the respective individual pads. A menu bar 503 may also be provided to allow users to customize individual pads 502 and to provide other audio generation capabilities, including digital effects, sequencing, quantization and the like. In the embodiment of FIG. 5B, another user audio interface is provided, where virtual buttons 504 are provided, together with a button path 505, where a user "draws" along the button path 505 between buttons 504 to create audio.

Figure 5C:
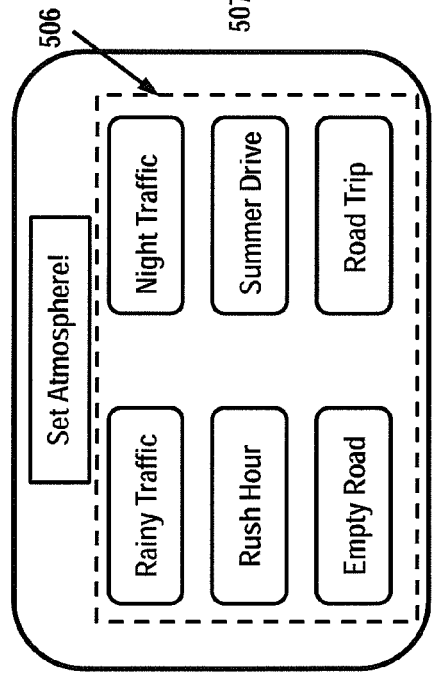

In FIG. 5C, users may manually select a state or atmosphere for audio generation that may be dependent or independent of state determination discussed above in connection with FIG. 4. Within active area 506, users may manually select a state or atmosphere, such as "rainy traffic,""night traffic," "rush hour," summer drive," "empty road" and "road trip." By allowing users to manually select a state or atmosphere, users can more readily access favorite audio generation templates, regardless of the state being currently detected by the system. It should be understood that the examples of FIG. 5C are merely illustrative, and that other states, atmospheres or interface structures are contemplated in this disclosure. For example, music genre selections (e.g., rock, ambient, techno, etc.) may be provided in active area 506, where selection of a specific genre by a user loads one or more audio templates for audio generation.

Figure 5D:
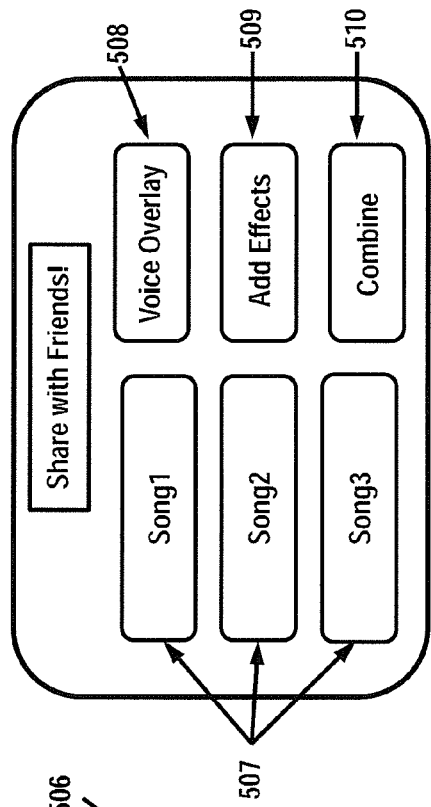

FIG. 5D illustrates yet another embodiment, where users may select, listen to, and/or share audio/songs that were generated. Users may select a specific song 507 for playback on the device, or through the vehicle entertainment system (e.g., via a Bluetooth connection), or transmit the audio (song) to other registered or unregistered users for later playback. Songs 507 may also be emailed, messaged or uploaded to a social media service for playback as well. In addition to playback, songs 507 may be further subjected to post-generation processing to allow voice overlays 508 to be added to a song, add digital effects 509 to a song, or combine multiple songs (e.g., song1+song3) to form a single song.

As can be appreciated by those skilled in the art, the above disclosure provides a variety of configurations for audio generation. As discussed above, a device application configured to dynamically generate or modify audio can receive multiple inputs from several devices at the same time. The primary device can authorize which users can connect to the application and displays which users are connected. These users can influence the audio playback with their own device using a variety of interfaces. Audio effects can be triggered remotely with virtual buttons or physical buttons. Gestures or patterns "drawn" onto a touch screen device can trigger audio effects on the audio generation application. Games or challenges for a user may be presented for performing particular gestures in a particular order or at a particular time, which in turn affects audio playback. A device microphone (e.g., 322) can record audio, where one device may manipulate it. In one embodiment, the manipulated file may be transmitted to another device for integration into the main audio playback.

In addition, device data from a gyroscope or accelerometer (e.g., 307) may be used to manipulate audio or music being recorded and used to control audio effects. In one embodiment, audio generation in a device may be influenced by physically shaking a portable device. In this embodiment, the user may shake the device trying to match the rhythm and tempo of the audio generation and playback. An audio sound, such as a shaker sound, may be played back in the same tempo and rhythm as the phone while being shaken. Alternately, an audio filter may be applied to the audio, where the filtering frequency is altered based on the accelerometer feedback.

Furthermore, audio application users who are not in the same vehicle but within the proximity to the primary device can trigger different effects in the audio playback such as unlocking instruments or sound themes. In one embodiment, a unique handshake protocol between vehicles of registered users of the same application would allow users to automatically connect with each other. The proximity could be detected and the handshake initiated via Bluetooth or WiFi. Since the audio playback is influenced by real time events, a unique soundtrack and atmosphere is being created in the vehicle. This experience can be shared on the go by tapping a button and sharing a sample of the music played to different social networks. In addition, the user interface may contain a mechanism that allows users to add a personal message at the beginning, end or on top of the music before sharing.

In one embodiment, vehicle or device location, which may be determined by GPS, may be used to optimize an "excitement factor" for the generated audio/music. As one goal of dynamically adjustable audio is to provide an entertaining soundtrack that matches a driving environment and/or experience, it would be advantageous to use map/route information, as well as remaining time of a current driving path, to generate a desirable soundtrack for the drive. In one embodiment, the vehicle GPS system is used for this purpose. However, since vehicle GPS systems are typically not active, for example, when drivers follow a common and familiar drive, the device GPS or device location services may be used. A user may enter common or "favorite" locations (e.g., home, work, friends/relatives homes, shopping, restaurants, etc.), and store them. Using geocoding and/or reverse geocoding, the GPS coordinates of these locations are determined. Using a basic learning algorithm, the system may compare a current location (e.g. via phone GPS) with the saved locations and determines if the user is moving between matched points, how long it will take the user on average to drive between the points, and the average distance. After a while, the algorithm will determine if the user is on en route to a location, or is "out of bounds" and not on the route between the saved locations. The algorithm will be able to calculate a "music excitement factor" based on current location, time since start, and driven distance. Using the "music excitement factor," the audio soundtrack can control the overall length, intros/outros and dynamic highlights that can be played at the right time to match the drive.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for generating audio, comprising:
   a first input configured to receive vehicle data received from a vehicle comprising information relating to a vehicle characteristic, wherein the vehicle characteristic comprises at least one vehicle parameter indicating an operational state of a vehicle component;
   a storage, operatively coupled to the input, for storing the vehicle data received from the vehicle and a plurality of audio generation applications, wherein each of the plurality of audio generation applications are associated with a respective vehicle state;
   processing means, operatively coupled to the storage, wherein the processing means is configured to process the vehicle data received from the vehicle over a predetermined period of time to determine a vehicle state and invoke at least one of the plurality of audio generation application that is associated with the determined vehicle state;
   a second input, configured to receive user input data comprising physical inputs from a user, wherein the processing means is further configured to generate audio in the apparatus based on the user input data;
   a third input for receiving device data comprising information indicating the presence of a device proximate to the apparatus; and
   a paired device that contains a device ID registered to at least one user,
   wherein device registration is stored on the vehicle according to the device ID, and
   wherein device registrations include a device user profile associated with each device ID that includes at least one of a demographic data, user interests, or user device/vehicle history.

2. The apparatus of claim 1, wherein the first input comprises a wireless interface.

3. The apparatus of claim 1, wherein the audio generation application comprises at least one of a software synthesizer, a sampler, and effect processing module.

4. The apparatus of claim 1, wherein the apparatus comprises other user input data comprising physical inputs from another user associated with the device, wherein the processing apparatus is configured to generate and/or modify audio based on the other user input data.

5. The apparatus of claim 1, wherein the processing means is further configured to generate audio based on the vehicle data.

6. The apparatus of claim 1, wherein the processing means is configured to store the generated audio into the storage as a file.

7. A method for generating audio in an apparatus, comprising the steps of:
   receiving vehicle data from a vehicle at a first input of the apparatus, said vehicle data received from the vehicle comprising information relating to a vehicle characteristic;
   processing the vehicle data received from the vehicle in a processor of the apparatus to determine a vehicle state;
   receiving user input data at a second input of the apparatus, wherein the user input data comprises information relating to physical inputs from a user;
   receiving device data at a third input of the apparatus, wherein the device data comprises information indicating the presence of a device proximate to the apparatus;
   pairing with the device that contains a device ID registered to at least one user;
   storing device registration of the paired device on the vehicle according to the device ID;
   invoking an audio generation application in the apparatus based on the vehicle data; and
   generating audio using the audio generation application, wherein at least a portion of the audio is generated using the user input data,
   wherein device registrations include a device user profile associated with each device ID that includes at least one of a demographic data, user interests, or user device/vehicle history.

8. The method of claim 7, wherein the vehicle data is received via one of a wired and a wireless interface.

9. The method of claim 8, wherein processing the vehicle data received from the vehicle comprises processing a vehicle parameter indicating an operational state of a vehicle component.

10. The method of claim 9, wherein the vehicle data received from the vehicle is processed over a predetermined period of time.

11. The method of claim 7, wherein invoking the audio generation application comprises invoking at least one of a software synthesizer, a sampler, and effect processing module.

12. The method of claim 7, wherein the method further comprises the steps of:
receiving device data comprising other user input data comprising physical inputs from another user associated with the device; and
at least one of generating audio and modifying generated audio based on the other user input data.

13. The method of claim 7, wherein the method further comprises the steps of:
receiving device data comprising information indicating the presence of a secondary device proximate to the apparatus; and
transmitting generated audio to the secondary device.

14. The method of claim 7, wherein generating audio using the audio generation application comprises generating audio based on the vehicle data received from the vehicle.

15. The method of claim 7, comprising the step of storing the generated audio as a file.

16. A processor-based method for reproducing audio in a vehicle entertainment system, comprising the steps of:
receiving device data comprising information indicating the presence of a portable device proximate to the vehicle entertainment system;
establishing a connection with the portable device by pairing with the portable device;
registering the portable device that contains a device ID to at least one user;
storing the device registration on the vehicle according to the device ID
producing vehicle data in a processor, said vehicle data comprising information relating to a vehicle characteristic to determine a vehicle state;
transmitting the vehicle data to the portable device via the connection;
receiving audio for reproduction in the vehicle entertainment system via the connection, wherein the audio is based at least in part on the vehicle data and input data from the device, said input data reflecting physical inputs made from a user;
reproducing the received audio in the vehicle entertainment system,
wherein device registrations include a device user profile associated with each device ID that includes at least one of a demographic data, user interests, or user device/vehicle history.

17. The processor-based method of claim 16, wherein the vehicle data comprises a vehicle parameter indicating an operational state of a vehicle component.

18. The processor-based method of claim 16, wherein the vehicle data is produced over a predetermined period of time.

19. The processor-based method of claim 16, wherein reproducing the received audio comprises one of (i) reproducing the received audio as a digital stream, and (ii) reproducing the received audio as a digital file.

20. The processor-based method of claim 16, wherein the connection with the portable device is established via a wireless connection.

21. The apparatus of claim 1, wherein the processing means is further configured to process device data to determine that the paired device is a primary user or a passenger.

22. The method of claim 7, further comprising processing the device data to determine that the device is a primary user or a passenger.

23. The processor-based method of claim 16, further comprising processing the device data to determine that the device is a primary user or a passenger.

* * * * *